United States Patent [19]

Bäversten et al.

[11] Patent Number: 5,896,430
[45] Date of Patent: Apr. 20, 1999

[54] METHOD AND A DEVICE FOR FUEL HANDLING

[75] Inventors: Bengt Bäversten; Karl-Erik Nyström; Anders Rosengren; Antti Suvanto, all of Västerås, Sweden

[73] Assignee: ABB Atom AB, Vasteras, Sweden

[21] Appl. No.: 08/841,407

[22] Filed: Apr. 30, 1997

[30] Foreign Application Priority Data

May 10, 1996 [SE] Sweden ................................ 9601808

[51] Int. Cl.$^6$ .......................................... G21C 19/18
[52] U.S. Cl. ....................... 376/264; 376/262; 376/269; 376/270
[58] Field of Search .................................. 376/261, 262, 376/264, 268, 269, 270, 271

[56] References Cited

U.S. PATENT DOCUMENTS 5,019,327   5/1991  Fanning et al. ....................... 376/269
5,291,532   3/1994  Townsend et al. .................... 376/269
5,377,240  12/1994  Mallie ................................... 376/271

*Primary Examiner*—Daniel D. Wasil
*Attorney, Agent, or Firm*—Pollock, Vande Sande & Priddy

[57] ABSTRACT

The present invention is used in fuel handling for lifting of fuel assemblies and/or control rods out of/into a reactor vessel in a nuclear reactor. The reactor vessel comprises a reactor core with a plurality of fuel assemblies and control rods. A fuel pool is arranged adjacent the reactor vessel. A cassette comprising a plurality of storage positions for fuel assemblies and/or control rods is arranged near the reactor core, whereupon fuel assemblies and/or control rods are lifted out of the reactor core and arranged in the cassette. The cassette is then transported to the fuel pool for temporary storage.

8 Claims, 4 Drawing Sheets

METHOD AND A DEVICE FOR FUEL HANDLING

TECHNICAL FIELD

The present invention relates to a method and a device for handling fuel assemblies in a light-water nuclear power reactor comprising a reactor vessel with a reactor core. More particularly, the invention relates to such handling of fuel assemblies which occurs when fuel assemblies are to be replaced or transferred to a new position when the reactor vessel or parts connected thereto are to be serviced and therefore have to be emptied of fuel assemblies.

BACKGROUND OF THE INVENTION

A light-water nuclear power plant comprises a reactor vessel which encloses a reactor core. The reactor core comprises a large number of fuel assemblies. More particularly, the core comprises normally between 400 and 1000 fuel assemblies. A fuel assembly comprises a bundle of fuel rods. The fuel rods in turn comprise pellets of a nuclear fuel. A coolant in the form of water is arranged to flow from below and up through the core to cool the fuel rods while nuclear fission is in progress. The heated coolant is evaporated whereupon it is passed to a turbine for conversion into electric energy. After a certain burnup time of the fuel assemblies, it is normal either to reject them or to transfer them within the fuel core in order to burn them out further. Such refuelling or transfer of fuel takes place upon shutdown of the nuclear power plant. During the shutdown, work is normally carried out also in the reactor vessel and in other systems which are connected to the reactor vessel. Such a shutdown is very costly and takes approximately three to eight weeks. Therefore, it is desirable to do whatever is possible to limit this shutdown time to the shortest possible time.

The refuelling in a nuclear power plant thus comprises (a) replacing burnt-up fuel assemblies with new ones, and (b) transferring a large number of fuel assemblies in the core to obtain optimum burnup. During such refuelling, the fuel assemblies are normally handled one by one. When the reactor vessel is opened to make the fuel assemblies accessible, a handling tool is moved down into the core and is brought to grip a fuel assembly which is to be temporarily placed in a fuel pool. Normally, control rods arranged between the fuel assemblies are left in the reactor vessel. Further fuel assemblies are lifted out of the core and placed at an arbitrary location in the pool. Thereafter, new fuel assemblies are lifted from the pool into the reactor vessel to the new empty positions. The fuel assemblies are thus lifted one by one. The fuel assemblies which are to be transferred within the core are normally moved directly from their old to their new positions.

In the event that work has to be carried out in the reactor vessel or in adjacently located systems, such as pumps directly connected to the reactor vessel, a suitable number of fuel assemblies have to be lifted out therefrom and be temporarily placed at an arbitrary location in the fuel pool. In certain cases, the whole reactor vessel may have to be emptied of fuel assemblies.

The lifting of the fuel assemblies one by one out of and into the reactor vessel, respectively, is one of the independent work operations during the shutdown which takes a relatively large proportion of the total shutdown time. The purpose of the present invention is to provide a method of reducing the time of the fuel handling and hence the total shutdown time.

SUMMARY OF THE INVENTION

The present invention relates to a method and a device which considerably reduce the time of shutdown when fuel assemblies are to be lifted out of or into a reactor vessel.

According to one aspect of the method according to the invention, the whole, or parts of, the reactor core is/are transported simultaneously from the reactor vessel to the fuel pool located adjacent thereto. The transport takes place in a forced manner by moving groups containing a plurality of fuel assemblies and/or control rods simultaneously between the reactor vessel and the fuel pool. The groups may contain fuel assemblies with an arbitrary order or with a mutual order corresponding to the order of the fuel assemblies in the reactor vessel.

To bring about the forced transport, a fuel cassette is provided which accommodates the number of fuel assemblies which are to be simultaneously transported between the reactor vessel and the fuel pool. Such a fuel cassette preferably comprises four, eight or twelve fuel assembly positions. The fuel cassette may be designed so that each fuel assembly position is surrounded by four vertical walls of a neutron-absorbing material forming a sleeve-formed space. The respective sleeve-formed spaces have a length which substantially corresponds to the length of a fuel assembly so that a fuel assembly arranged in the fuel cassette is substantially surrounded by these walls.

A fuel cassette comprising, for example, eight fuel assembly positions may be designed with two rows with sleeve-formed spaces in which four sleeve-formed spaces are arranged in each row. The sleeve-formed spaces in a fuel cassette with four or twelve fuel assembly positions are arranged in the same way with two rows of sleeve-formed spaces in which, respectively, two and six sleeve-formed spaces are arranged in each row. Alternatively, the sleeve-formed spaces may be arranged in a single row. The sleeve-formed spaces are provided with a bottom part against which the fuel assembly arranged therein may rest. In one embodiment of the invention, the sleeve-formed spaces are arranged with an opening facing upwardly for inserting and extracting the fuel assemblies. In another embodiment of the invention, a vertical opening in the sleeve wall is provided for loading and unloading the fuel assemblies, respectively, in the lateral direction. In a further embodiment of the invention, this opening is provided with a closable port.

When lifting fuel assemblies from a reactor vessel, a fuel cassette of any of the above-mentioned types is arranged at a location in the reactor vessel above the core grid. A handling member is adapted to lift the fuel assemblies one, by one or in groups, and arranging them in the fuel cassette. One example of lifting in groups is the lifting of a core module comprising four orthogonally arranged fuel assemblies and possibly the control rod arranged therebetween. The fuel assemblies are arranged either one or more, preferably four, each in one sleeve-formed space in the fuel cassette. When the fuel cassette is filled with the desired number of fuel assemblies, this is transported to a position in the fuel pool where it is lowered and left in its entirety for temporary storage. A new fuel cassette is arranged in the reactor vessel and is filled with fuel assemblies until the required number of fuel assemblies are moved out of the core for the action to be taken.

The advantage of the invention is that a considerable gain in time can be made by lifting a plurality of fuel assemblies simultaneously out of/into the reactor vessel and by transporting a plurality of fuel assemblies simultaneously to and from the reactor vessel, respectively. The time for shutdown of the nuclear power plant can be further reduced in those cases where laterally loaded fuel cassettes are used since the height that the respective fuel assembly has to be lifted for loading and unloading, respectively, can be reduced by approximately four meters. The shutdown time reduction results in a considerable cost saving.

BRIEF DESCRIPTION OF THE DRAWINGS

The invention will be most readily understood with reference to the accompanying drawings, wherein FIG. 1 schematically shows, in a view from the side, a reactor vessel in a reactor pool and an adjacently located fuel pool.

DESCRIPTION OF THE PREFERRED EMBODIMENTS

Figure 1:
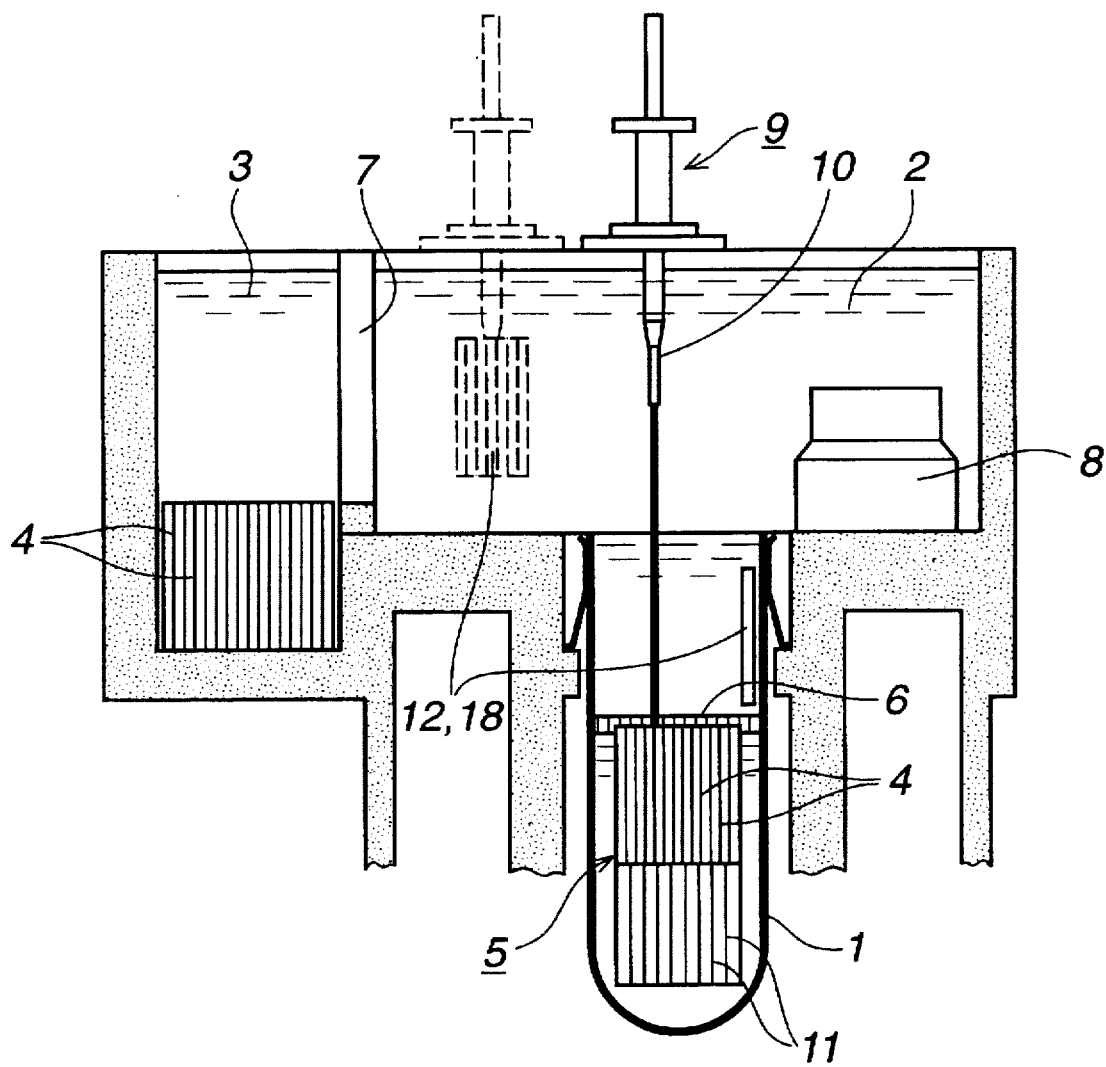

FIG. 1 shows part of a nuclear power plant comprising a reactor vessel 1 with a removed reactor vessel cover, not shown in the figure, arranged in a water-filled reactor pool 2. Further, a so-called fuel pool 3 is shown arranged adjacent to the reactor pool 2. The fuel pool 3 is substantially designed for temporary storage of new and completely or partially burnt-up fuel assemblies 4, respectively. The reactor vessel 1 comprises a core 5 with a plurality of fuel assemblies 4 and control rods 11 and a core grid 6 arranged above the core 5. The reactor pool 2 is connected to the fuel pool 3 via a closable opening 7. The other internal parts 8 of the reactor can be temporarily arranged in the reactor pool 2.

During shutdown of the nuclear reactor, the reactor vessel 1 is filled with water and the reactor vessel cover removed. Then, the reactor pool 2 above the reactor vessel 1 is filled with water, and the port 7 between the reactor pool 2 and the fuel pool 3 is opened. Internal reactor parts 8 arranged above the core 5 are lifted out and arranged in the reactor pool 2. The core grid 6 and the fuel assemblies 4 arranged below the grid are now available for a gripper 9 arranged in the reactor hall. A fuel cassette 12 is arranged in the reactor vessel 1 above the core grid 6. The gripper comprises, for example, a telescopic arm 10 for lowering into the reactor vessel 1 and raising one or more fuel assemblies 4 therefrom and loading these in the fuel cassette 12. When the fuel cassette 12 is filled with the desired number of fuel assemblies 4, it is transported to the fuel pool 3 by the gripper 9.

FIG. 1 shows the gripper 9 in dashed lines during transportation of a fuel cassette 12 comprising a group 4a of fuel assemblies 4 and possibly control rods 11.

Figure 2:
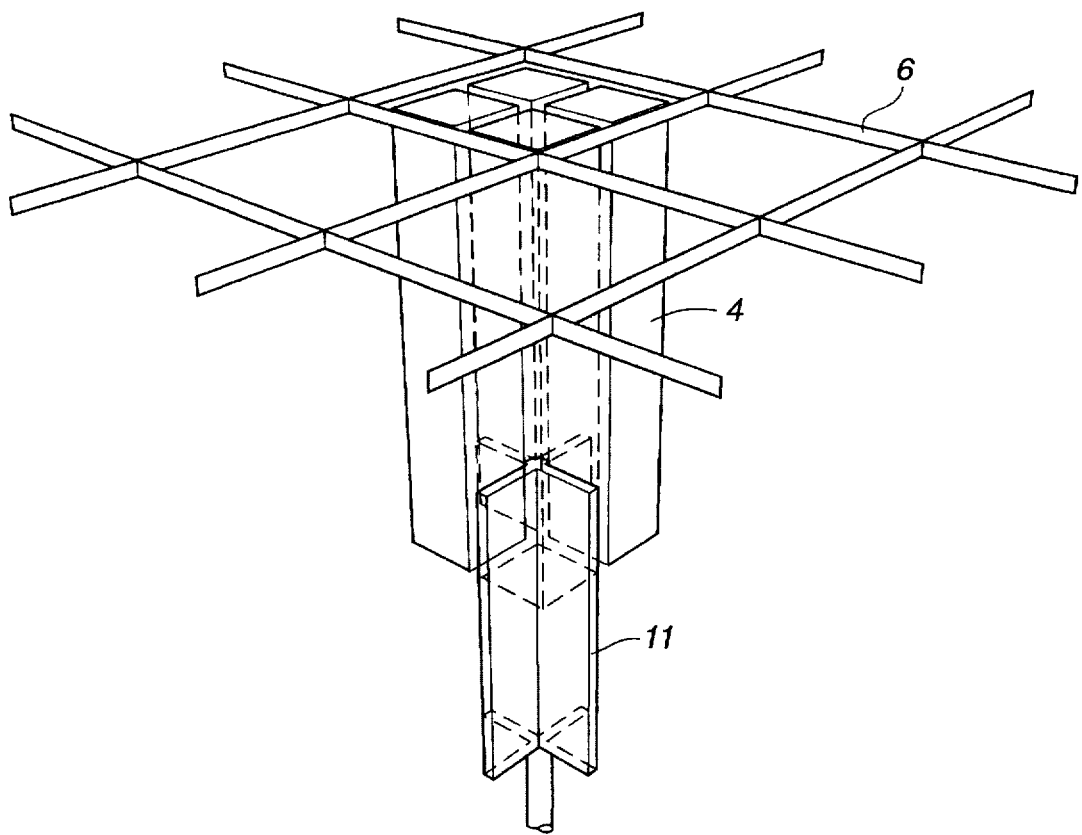
FIG. 2 illustrates a reactor core grid, a core module with four fuel assemblies and a control rod arranged therebetween.

The fuel assemblies 4 are lifted out through the openings in the core grid 6. Also FIG. 2 shows, in principle, the appearance of the core grid 6. The core grid 6 comprises a grid having an opening in the grid which corresponds to the size of a core module, i.e., four adjacently located fuel assemblies 4 and one cruciform control rod 11 arranged therebetween. The control rods 11 may either be lifted out together with the fuel assemblies 4, or be left in the reactor core 5. The removed control rods are placed temporarily in the fuel pool 3 together with the fuel assemblies 4.

Figures 3, 4, 5:
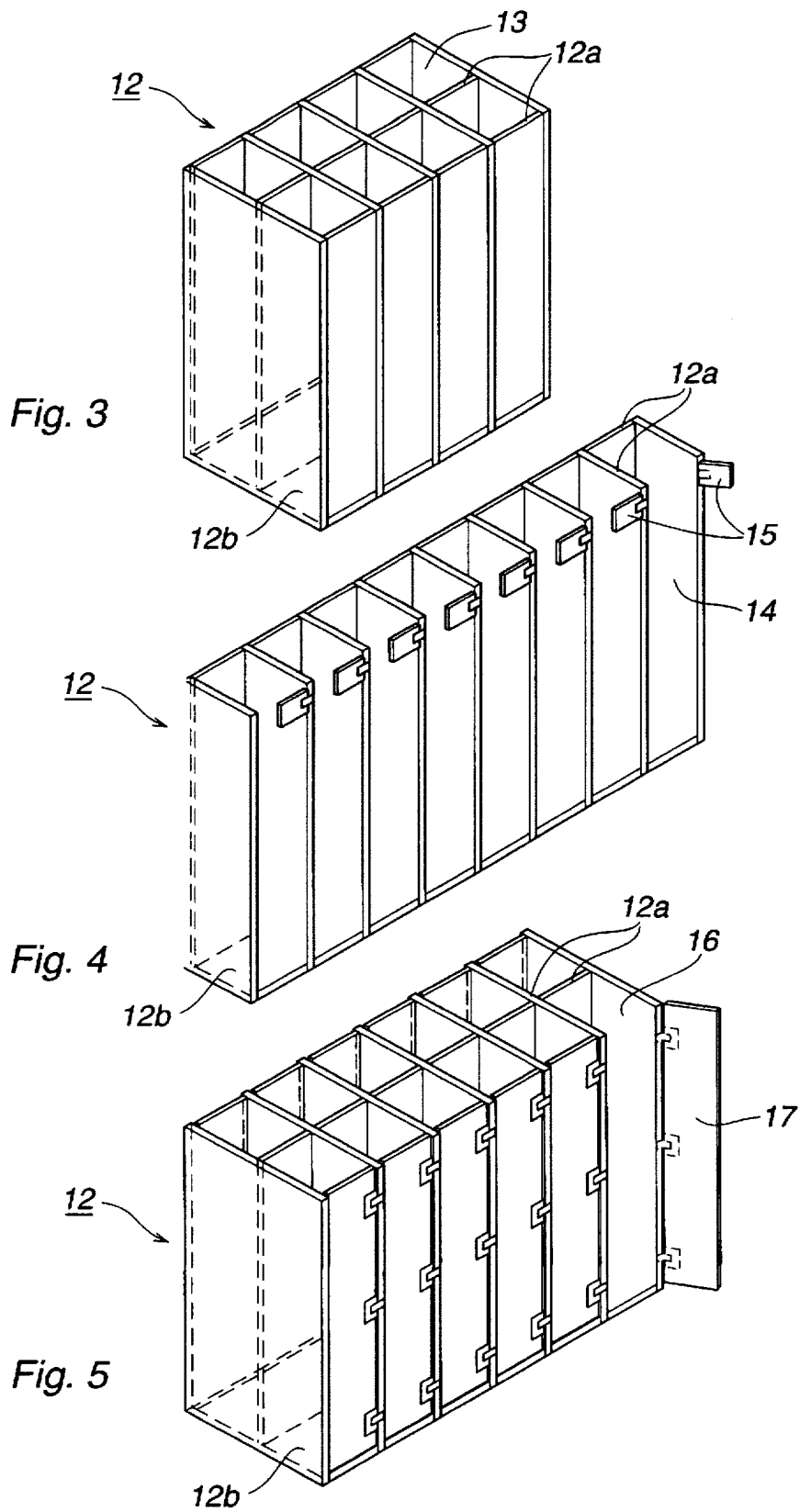
FIG. 3 shows in perspective view a two-row fuel cassette intended for eight fuel assemblies and loading via an opening arranged at the top.
FIG. 4 shows in perspective view a single-row fuel cassette intended for eight fuel assemblies and loading via a vertical opening, each provided in the wall of a sleeve-formed space.
FIG. 5 shows in perspective view a two-row fuel cassette intended for twelve fuel assemblies and loading via a vertical opening, each provided in the wall of a sleeve-formed space wherein each sleeve-formed space is provided with a closable port.

FIG. 3 shows a two-row fuel cassette 12 intended for eight fuel assemblies 4 or 8 core modules and loading via an opening 13 open at the top. Fuel cassette 12 comprises eight substantially vertically arranged sleeve-formed spaces having a substantially square cross section. Each sleeve-formed space is limited by walls 12a made of a neutron-absorbing material and a bottom part 12b. The sleeve-formed spaces are joined to each other form one unit for transport and storage of fuel assemblies 4 and possibly control rods 11. When a fuel assembly 4 or a group of fuel assemblies 4, which is not a core module, is lifted out of the reactor core 5, these are each arranged in a sleeve-formed space in the cassette 12. Then, an additional fuel assembly 4 or another group 4a is lifted out of the reactor core 5 and is arranged in the fuel cassette 12. When lifting of a core module is made, this is preferably arranged in a sleeve-formed space surrounding the whole core module. The lifting operation continues until the fuel cassette 12 is filled with the desired number of fuel assemblies 4 or core modules, whereupon the fuel cassette 12 is transported to the fuel pool 3 for temporary storage therein. Possibly, one or more of the fuel assemblies 4 are replaced in the fuel cassette 12 while this is stored in the fuel pool 3. Fuel assemblies 4 may also be transferred in or between the fuel cassettes 12 when these are placed in the fuel pool 3. When it is time again for inserting the fuel assemblies 4 into the reactor core 5, the fuel cassettes 12 are transported from the fuel pool 3 to a location in the reactor vessel 1 above the core 5. Thereafter, the fuel assemblies 4 are lifted one by one, by groups, or by core modules out of the fuel cassette 12 and are arranged in the reactor core 5.

FIG. 4 shows a single-row fuel cassette 12 intended for eight fuel assemblies 4 or for eight core modules and loading via a vertical opening 14, each arranged in the wall of a sleeve-formed space. Each vertical opening 14 is provided with a stop means 15 for fixing the fuel assemblies 4 in the fuel cassette.

FIG. 5 shows a two-row fuel cassette 12 with twelve sleeve-formed spaces intended for twelve fuel assemblies 4. Each sleeve-formed space is provided with a vertical opening 16 extending along the substantial length of the sleeve-formed space. The opening 16 is provided with a port 17 intended for sealing the sleeve-formed space during transport and storage of the fuel assembly 4 arranged therein.

Figure 6:
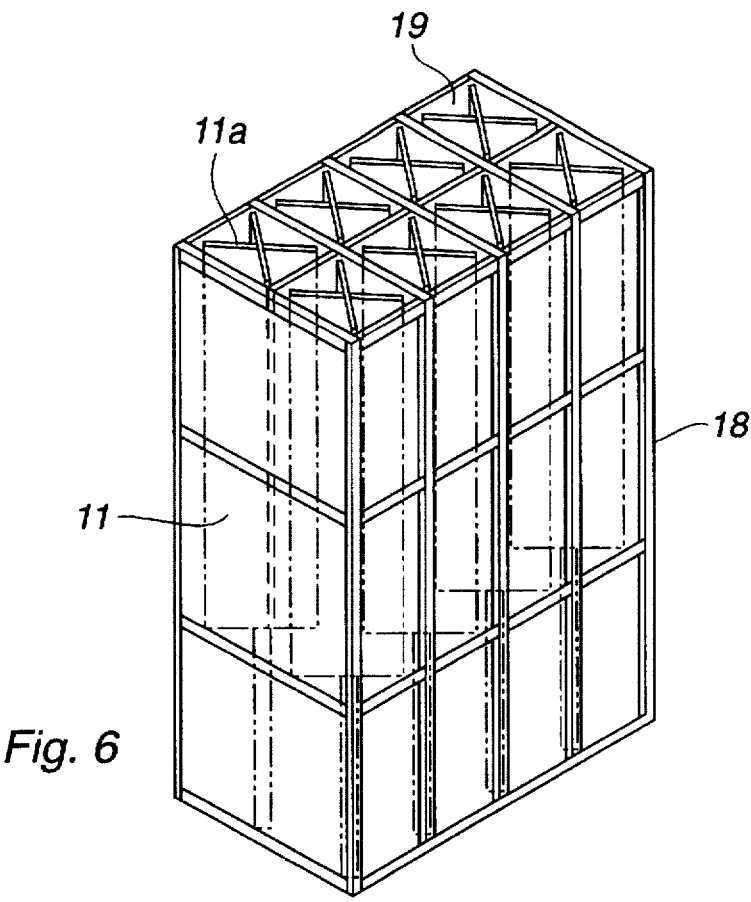
FIG. 6 shows a control rod cassette for transporting eight control rods.

During a shutdown of the reactor, the fuel assemblies 4 are normally lifted out whereas the control rods 11 are left in the reactor vessel 1. If it is desired also to lift out the control rods 11, this can be done either by lifting them out together with the core modules as mentioned above, or in a work operation separate from the lifting of the fuel assemblies 4. According to one aspect of the invention, the control rods 11 are arranged in control rod cassettes 18 in a way corresponding to the arrangement of the fuel assemblies 4 in fuel cassettes 12. FIG. 6 shows an embodiment of a control rod cassette 18. The control rod cassette 18 comprises a frame structure 18 formed with eight control rod positions 19. Alternatively, the control rod cassette 18 may be designed so that the control rods 11 can be arranged with their control rod blades 1b overlapping each other. The control rod cassette 18 is preferably designed so that it can be loaded laterally, that is, with a vertical opening corresponding to the openings 14, 16 in the fuel cassette 12 in FIGS. 4 and 5, respectively. Preferably, the same gripper 9 is used for lifting the control rods 11 as for lifting the fuel assemblies 4. By arranging a plurality of control rods 11 in one control rod cassette, the emptying of the reactor vessel 1 is further accelerated. The control rod cassette 18 is arranged in the fuel pool for temporary storage in the same way as the fuel assembly cassettes 12.

Figure 7:
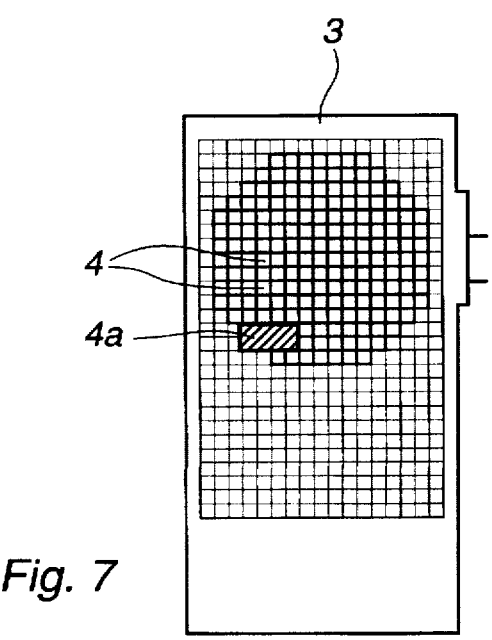
FIG. 7 shows schematically, in a view from above, positions in a fuel pool intended for receiving fuel cassettes, and how a cassette is arranged in a fuel pool.

FIG. 7 shows how the fuel pool 3 is divided into a number of positions. Each of these positions consists of a square in the grid shown. When a fuel cassette 12 is arranged in the fuel pool 3, this can be arranged at an arbitrary location therein; for example, in the dashed position relating to a two-row fuel cassette with eight fuel assemblies 4 according to FIG. 3. In one embodiment of the invention, the fuel cassettes 4 are filled and arranged in the fuel pool 3 in such a way that each fuel assembly 4, removed from the reactor core 5, in the fuel pool 3 is given a position which, in relation to the other removed fuel assemblies 4, is the same as in the reactor core 5. In this way, the same geometry is obtained in the fuel pool 3 as in the fuel core 5.

In those cases where refuelling or fuel transfer is to take place, this is suitably performed while the fuel cassettes 12 are placed in the fuel pool 3. At the same time as the refuelling and/or the fuel transfer takes place in the fuel pool, the reactor vessel 1, or parts connected thereto, is/are freely available for servicing. When the servicing is completed and the fuel assemblies 4 are possibly replaced or transferred, the fuel assemblies 4 are transferred in their respective fuel cassettes 12 again to a location in the reactor vessel 1 whereupon the fuel assemblies 4 are moved from the fuel cassette 12 and filed down onto their position in the reactor core 5.

It is self-evident that the different types of fuel cassettes 12 and control rod cassettes 18 may be arbitrarily provided with any of the openings 12, 14, 16 which are shown and be provided in a suitable way with ports 17 or stop means 15.

We claim:

1. A method in fuel handling for lifting fuel assemblies and/or control rods out of/into a reactor vessel in a nuclear reactor, wherein the reactor vessel comprises a reactor core with a plurality of fuel assemblies and control rods and wherein a fuel pool is arranged adjacent the reactor vessel, said method comprising the steps of:

arranging a cassette comprising a plurality of storage positions for fuel assemblies and/or control rods adjacent the reactor core;

lifting fuel assemblies and/or control rods out of the reactor core and arranging in the cassette;

transporting the cassette to the fuel pool for temporary storage and transporting the cassette back to the reactor vessel for reinsertion into the reactor core of the fuel assemblies and/or the control rods arranged in the cassette.

2. A method according to claim 1, further comprising loading the cassette with fuel assembles and/or control rods in the lateral direction.

3. A device used for lifting fuel assemblies and/or control rods out of/into a reactor vessel in a nuclear reactor, the reactor vessel comprising a reactor core with a plurality of fuel assemblies and control rods, and a fuel pool being arranged adjacent the reactor vessel, the device comprising a cassette with at least two substantially vertically arranged sleeve-formed spaces, each of the sleeve-formed spaces being provided with an opening for loading at least one or more fuel assemblies and/or control rods for transporting the cassette with the fuel assemblies and/or control rods between the reactor vessel and the fuel pool and for temporary storage of the cassette with the fuel assemblies and/or control rods in the fuel pool.

4. A device according to claim 3, wherein each of the sleeve-formed spaces is formed of walls of a neutron-absorbing material and a bottom part.

5. A device according to claim 3, comprising four, eight or twelve sleeve-formed spaces arranged in one or two rows.

6. A device according to claim 3, wherein each of the sleeve-formed spaces is designed for accommodating a fuel assembly or a control rod, or a core module with four fuel assemblies and a control rod arranged therebetween.

7. A device according to claim 3, wherein at least one of the sleeve-formed spaces comprises an opening provided in the vertical wall portion of the sleeve-formed space for unloading and loading, respectively, the fuel assemblies and/or the control rods in the lateral direction and wherein the opening extends substantially along the whole vertical extent of the sleeve-formed space.

8. A device according to claim 7, wherein the opening is provided with a port for sealing the sleeve-formed space during transportation and storage.

* * * * *